(12) United States Patent
Behan

(10) Patent No.: US 6,442,401 B1
(45) Date of Patent: Aug. 27, 2002

(54) ANALYZING A PACKET RADIO CELLULAR COMMUNICATIONS NETWORK

(75) Inventor: Paul Behan, Co Cork (IE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/440,526

(22) Filed: Nov. 15, 1999

(30) Foreign Application Priority Data

Mar. 1, 1999 (GB) .............................................. 9904459

(51) Int. Cl.$^7$ ................................................. H04B 1/38

(52) U.S. Cl. ........................ 455/552; 455/553; 455/422; 455/423; 455/445; 370/252; 370/338; 370/352

(58) Field of Search .................................. 455/552, 553, 455/422, 424, 67.1, 507, 560; 370/252, 321, 328, 338, 709, 220, 221, 222, 223, 224, 352

(56) References Cited

U.S. PATENT DOCUMENTS 6,104,929 A * 8/2000 Josse et al. .................. 455/445
6,275,695 B1 * 8/2001 Obhan ......................... 455/423

FOREIGN PATENT DOCUMENTS

WO         WO97/50271       12/1997

\* cited by examiner

*Primary Examiner*—Lee Nguyen
*Assistant Examiner*—Danh C Le

(57) ABSTRACT

A method and apparatus for analyzing a packet radio cellular communications network such as GPRS. The method comprises the steps of using a first operational unit, such as an OMC-R, to operationally manage a packet control unit of the network and provide packet control unit statistics, using a second operational unit, such as an OMC-G, to operationally manage one or more packet radio support nodes and provide support node statistics, and functionally combining one or more packet control unit statistics with one or more support node statistics to provide a joint network statistic.

8 Claims, 1 Drawing Sheet

ANALYZING A PACKET RADIO CELLULAR COMMUNICATIONS NETWORK

FIELD OF THE INVENTION

The present invention relates to analysing a packet radio cellular communications network. The present invention is applicable to, but not limited to, General Packet Radio Services (GPRS) cellular communications networks. The present invention can be used in conjunction with cellular radio communication systems such as the Global System for Mobile Communications (GSM), and also the Universal Mobile Telecommunication System (UMTS) currently under standardisation.

BACKGROUND OF THE INVENTION

One type of communications system is a cellular communications system. In a cellular communications system, the area over which service is provided is divided into a number of smaller areas called cells. Typically each cell is served from a base transceiver station (BTS) which has a corresponding antenna or antennas for transmission to and reception from a user station, normally a mobile station. Presently established cellular radio communications systems include GSM systems (Global System for Mobile Communications).

In systems such as GSM, voice communications and data communications pass through the same communications paths as each other. Thus an arrangement that is fully suited to speech is not necessarily fast enough for data traffic. In view of this, packet radio cellular communications networks are being introduced to handle data, preferably in an architecture compatible to be used as an overlay with an existing cellular radio communications system that can still handle speech and some data as required. One such system is known as General Packet Radio Services (GPRS), and this will work in conjunction with GSM systems. Packet radio systems are generally based on units called packet radio support nodes, in the case of GPRS these are for example a Serving GPRS Support Node and a Gateway GPRS Support Node.

In systems such as GSM and GPRS the network is managed, for example statistics gathered and monitored or analysed, by operational units called Operations and Maintenance Centres (OMC). Conventionally one or more OMC's are required for the radio parts of a network, and they are each known as an Operations and Maintenance Centre-Radio (OMC-R). Conventionally also, one or more OMC's are required for the switching parts of a GSM network, and they are each known as an Operations and Maintenance Centre-Switch (OMC-S). Conventionally the OMC-R and the OMC-S are separate units, often operated by different operators.

SUMMARY OF THE INVENTION

The present inventor has envisaged that packet radio systems should most suitably have a further type of OMC specific to the support nodes, which in the case of GPRS can be named Operations and Maintenance Centre-GPRS (OMC-G). This will mean that the statistics collected respectively from the OMC-R and the OMC-G will be separate, even to the extent of being defined by different names and being expressed in different units. The present inventor has envisaged however that due to the very nature of packet radio, namely that data will be sent in packets whose contents the carrying system is unconcerned with, it will be especially desirable to be able to consider the statistics from the OMC-R in conjunction with those from the OMC-G. However, conventional means of just listing the separate statistics together for an operator to interpret is disadvantageous, because the statistics will be disparate and must be continually interpreted in some intelligent sense on an ongoing basis to understand any overall effect derivable therefrom.

The present invention advantageously implements a means for the statistics of the overall system to be jointly employed in a powerful but simple manner. Moreover, the present invention advantageously provides a basis for more powerful insight into the operation of the network to be gained from versions of combined statistics facilitated by the present invention to an extent greater than would be the case by just bringing the various statistics together in a conventional manner.

According to one aspect of the present invention, there is provided a method of analysing a packet radio cellular communications network, as claimed in claim 1.

According to another aspect of the present invention, there is provided an apparatus for analysing a packet radio cellular communications network, as claimed in claim 7.

Further aspects of the invention are as claimed in the dependent claims.

Additional specific advantages are apparent from the following description and figures.

DESCRIPTION OF AN EMBODIMENT OF THE INVENTION

Figure 1:
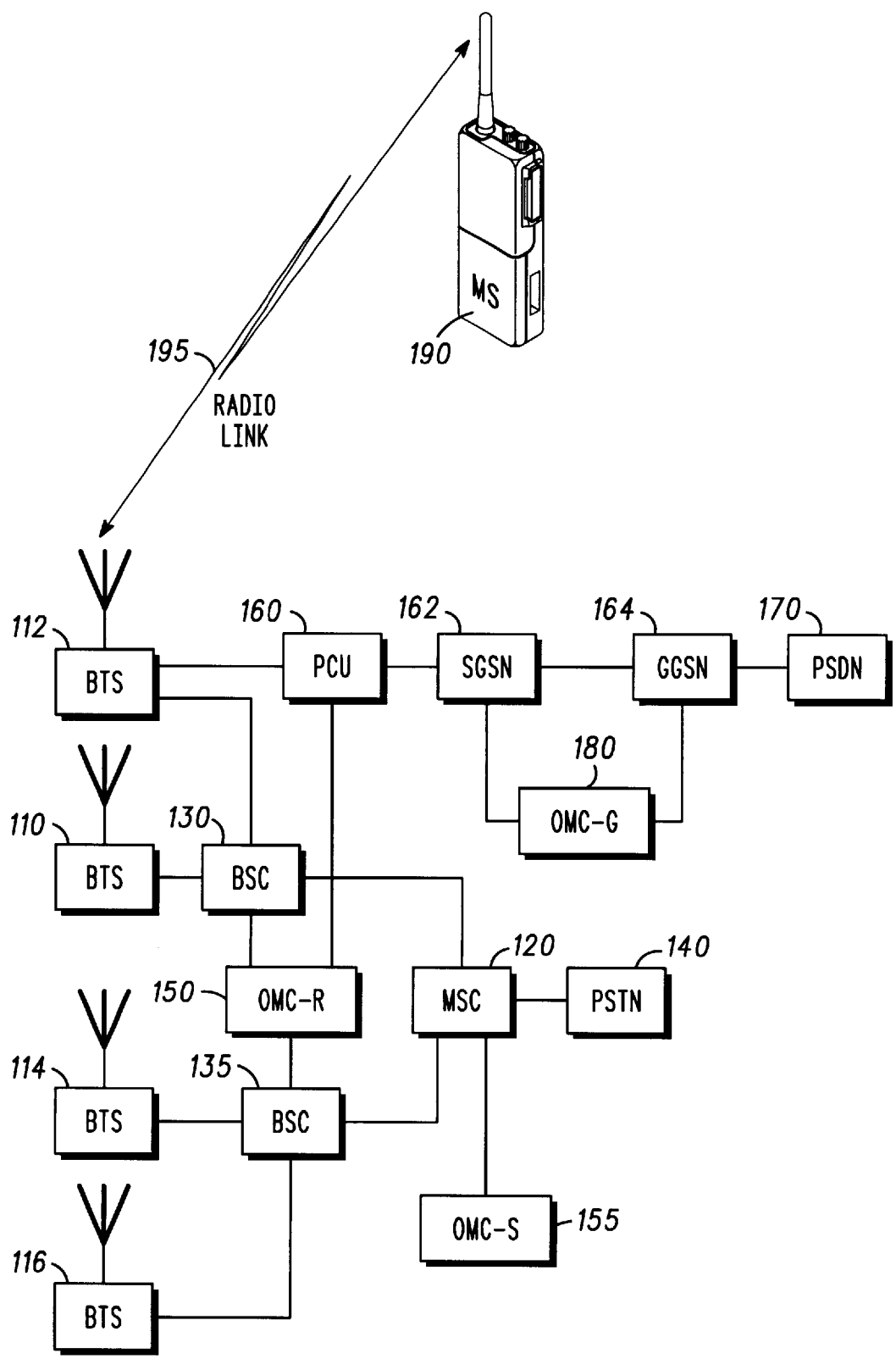
FIG. 1 is an illustration of a cellular communications system which is in accordance with the present invention.

The embodiment hereinafter described relates to a GPRS cellular communications network which is arranged as an extension of a GSM system, although it will be appreciated that the invention is not limited to such a network and can equally be used in other packet radio cellular communications networks, and can be used alone or in conjunction with other cellular systems such as GSM, other time division multiple access (TDMA) systems, code division multiple access (CDMA) systems, or combined TDMA-CDMA systems, and also the Universal Mobile Telecommunication System (UMTS) currently under standardisation.

One particular embodiment of the invention is now described by way of example only. FIG. 1 shows, in the form of a schematic illustration, parts of a GPRS network in conjunction with an associated GSM network.

The following parts of the system are ones that would typically also be present in a conventional GSM system without an associated GPRS network overlaid thereon. Two base transceiver stations (BTS) 110 and 112 are each coupled to mobile services switching centre (MSC) 120 through one base station controller (BSC) 130. BTS 110 and BTS 112 are each controlled by BSC 130. Two further base BTS's 114 and 116 are each coupled to MSC 120 through another BSC 135. BTS 114 and BTS 116 are each controlled by BSC 135. Each BTS provides a coverage area, known as a cell, of the cellular communications system. MSC 120 is further coupled to a public switched telephone network (PSTN) 140. An Operations and Maintenance Centre-Radio (OMC-R) 150 is also coupled to BSC's 130 and 135. This carries out operational management functions for the radio aspects of the system, including raising, collecting and analysing operational statistics from the radio aspects of the system. An Operations and Maintenance Centre-Switch (OMC-S) 155 is also coupled to MSC 120. This carries out operational management functions for the switch aspects of the system, including raising, collecting and analysing operational statistics from the switch aspects of the system.

In the present embodiment, the following GPRS system components are overlaid on the above described GSM system as follows. A radio element called Packet Control Unit (PCU) is present under GPRS. FIG. 1 shows one such a PCU 160 coupled to BTS 112. Other arrangements are possible, for example PCU 160 can alternatively be coupled to a different BTS compared to the GSM one. PCU 160 is then coupled to Serving GPRS Support Node (SGSN) 162 which is itself coupled to Gateway GPRS Support Node (GGSN) 164 which is itself coupled to Packet Switched Data Network (PSDN) 170. It is noted that sometimes Packet Switched Data Network is referred to as Public Switched Data Network. The presently described arrangement is merely exemplary, other equivalent or alternative layouts are possible within other packet radio cellular systems, and will be chosen according to the requirements of the particular system and circumstances under consideration. In the present embodiment PCU 160 is coupled to the same OMC-R 150 as is coupled to BSC's 130 and 135. OMC-R is thus arranged to additionally carry out operational management functions for the radio aspects of the GPRS network, in particular PCU 160, including raising, collecting and analysing operational statistics from the PCU 160. These statistics can conveniently be called PCU statistics. A separate Operations and Maintenance Centre-GPRS (OMC-G) 180 is coupled to both SGSN 162 and GGSN 164. This carries out operational management functions for the packet radio support nodes of the GPRS network, including raising, collecting and analysing operational statistics from the support nodes. These statistics can conveniently be called support node statistics.

For the sake of completion it is noted that the typical call handling arrangement for the overall structure shown in FIG. 1 is as follows. Consider a mobile station (MS) 190 involved in a call serviced by BTS 112 using radio link 195, as shown in FIG. 1. When the call is a data call to be handled by the GPRS cellular network, it is routed from BTS 112 to PCU 160 to SGSN 162 to GGSN 164 to PSDN 170. Statistics affecting or derived from the call will therefore be produced at OMC-R 150 and OMC-G 180. When the call is a speech call or a data call not allocated to GPRS, then it is routed from BTS 112 to BSC 130 to MSC 120 to PSTN 140. Statistics affecting or derived from the call will therefore be produced at OMC-R 150 and OMC-S 155.

As mentioned already above, the exact system and network configurations are merely exemplary. Other arrangements are possible, and indeed under systems such as UMTS the layout may organisationally appear somewhat different. Nevertheless, such other arrangements will fall under the present invention and derive benefit from it whenever they exhibit the separation between PCU statistics and support node statistics as illustrated above.

Under the present embodiment, once the packet control unit statistics and also the support node statistics have been provided in the above described manner, one or more of the packet control unit statistics are functionally combined with one or more support node statistics. The exact details of the form of the functional combination will depend upon the particular statistics involved, and also the requirements of the system under consideration. In its simplest form, a particular packet control unit statistic and a corresponding particular support node statistic will be called the same name and will be expressed in the same units. Furthermore, straightforward linear addition of the two statistic values s ill be practicable and meaningful. In such circumstances the functional combination will simply consist of arithmetic addition of the two values. In such a case, the value derived by addition of the two component values will form or provide a new value which represents a meaningful overall statistic which serves as a joint network statistic. In an alternative, more complicated or sophisticated situation, a particular packet control unit statistic and a corresponding particular support node statistic will be expressed in different units and will not be directly equivalent, although nevertheless they will be related in some manner or other. In this case, the mathematical function defining their functional combination will be of a more complicated or convoluted form than simple addition, and the mathematical definition thereof will be chosen according to the requirements of the particular situation or variables involved. The mathematical function will be implemented by means of program or algorithm in conventional manner selected according to the exact requirements. Processing of such mathematical functions will is carried out by conventional processing means consisting of hardware, software, or a mixture of hardware and software.

Merely by way of example, certain types of functional combination are as follows:

The support node statistic and the packet control unit statistic may be functionally combined by comparing their two values and assigning the highest or lowest value thereof as the joint network statistic. This would be suitable or advantageous in cases where the statistic under consideration was inherently of interest in terms of its worst case value in a chain of communications, for example as would be the case with a statistic based on data transfer rate. On the other hand, other statistics will be more linear in nature, for example number of occurrences of a specific type of fault.

Yet another possibility is one where the individual values of the respective support node statistic and packet control unit statistics are not inherently very critical in terms of their absolute values, but what is of interest is determination of the question as to whether the two values are consistent with each other. In this scenario, when the two values, i.e. the packet control unit statistic (or family of statistics) is consistent with the corresponding support node statistic or statistics, then this indicates that the corresponding interface is functioning adequately. In such a case one way of implementing a suitable functional combination for the purpose of functionally combining the packet control unit statistic and the support node statistic is to define the function as a subtraction of the two individual statistics, such that the corresponding joint network statistic will be equal to zero when the overall system is functioning correctly, and not equal to zero when not functioning incorrectly. Appropriate degrees of tolerance or accuracy will be incorporated according to conventional measures.

In a preferred version of the invention, a plurality of packet control unit statistics are functionally combined with each other prior to being combined with the one or more support node statistics. In a further preferred version of the invention, a plurality of support node statistics are functionally combined with each other prior to being combined with the one or more packet control unit statistics. In both such cases, an intermediate statistic is defined and corresponding value allocated, which enables even more efficient implementation.

It is noted that the specific choices of operational statistics to be considered and processed will depend upon the requirements of the particular system under consideration. A large number of operational statistics fall under the present invention. As described above, the details of advantageous functional combinations will vary. Nevertheless, in different cases the present invention advantageously facilitates powerful and efficient combination of statistics from separate aspects of an overall radio packet cellular communications network.

Merely by way of example, typical statistics encompassed are listed below. It is noted that the list includes statistics that are either specifically GPRS radio or specifically GPRS switching. Such statistics are included because they will respectively form one of the two, possibly disparate, statistics that can be advantageously combined according to this invention.

(a) Network Quality of Service (QoS)—End to End Performance—data throughput (transmission speed) (Switching and Radio)

Network QoS=average (number of data packets transmitted/second) by the system.

This is derived from radio transmission speed link transmission speed switching transmission speed (b) Physical Link utilization (Switching & Radio)

The physical link in question is the physical connection from the GPRS radio element to the GPRS switching element.

Physical Link utilization=Average (link utilization / link capacity) or all links in the network.

(c) Logical Link Utilization (Switching and radio)

The logical link in question is the logical connection from the GPRS radio element to the GPRS switching element.

Logical Link utilization=Average (link utilization / link capacity) for all links in the network.

This statistic is collected by both the switching and the radio elements. The statistic value should match in a correctly operating overall arrangement.

(d) Physical Link Availability (Switching & Radio)

Physical Link availability=Average (link uptime/total time) for all links in the network This statistic is collected by both the switching and the radio elements. The statistic value should match in a correctly operating overall arrangement.

(e) Switching Element Availability (Switching)

Switching Element Availability=element uptime/total time for all Switching elements in the network.

This statistic is collected by switching elements and can be used to compare switching elements in the system.

(f) Utilization of Switching Element Resources (Switching)

Switching Element Utilization=(element actual CPU utilization/ maximum CPU available) for all Switching elements in the network.

This statistic is collected by switching elements and can be used to compare switching elements in order to identify bottlenecks in the system.

(g) Switching Quality (Data Retranmission) Switching quality=(Data retransmitted/Total data transmitted).

This statistic is collected by switching elements and can be used to compare switching elements in order to identify faults in the system.

(h) RF Interface Quality (Radio)

RF Interface quality=(Data retransmitted/Total data transmitted).

This statistic is collected by radio elements and can be used to compare radio elements in order to identify faults in the system.

(i) RF Channel Utilization (Radio) RF Channel Utilization=(channel utilization/time) for all Switching elements in the network.

This statistic is collected by radio channels and can be used to compare radio channels in order to identify bottlenecks in the system.

(j) Network Access (RF Channel Congestion)—blocking (Radio)

RF channel congestion=(RF channel seizure successes/ RE channel seizure attempts).

This statistic is collected by radio channels and can be used to compare radio channels in order to identify bottlenecks in the system.

(k) Utilization of Radio Element Resources (Radio).

Radio Element Utilization=(element actual CPU utilization/max CPU available) for all radio elements in the network.

This statistic is collected by radio elements and can be used to compare radio elements in order to identify bottlenecks in the system.

(l) Radio Element Availability (Radio)

Radio Element Availability=element uptime/total time for all radio elements in the network.

This statistic is collected by radio elements can be used to compare radio elements in the system.

In the above described embodiment, the means for carrying out the various method steps were described as being at or in specific OMC's. It is however to be appreciated that such means can be located in other parts of the communications system, including distributed at more than one location. The present invention can also be implemented by software or by hardware or by a combination of software and hardware. It is also to be appreciated that component parts of the means to implement the present invention can constitute dedicated equipment or can alternatively consist of existing equipment arranged to perform the herein described method in addition to still also performing other functions, which other functions may in themselves already be known in the art. When in the form of dedicated equipment, such equipment may be located within existing communications systems parts, such as existing OMC's, or may alternatively be located remotely in the form of specific dedicated equipment and coupled to the communications system, for example coupled to one or more existing OMC's.

I claim:

1. A method of analysing a packet radio cellular communications network, the method comprising the steps of:

using a first operational and management centre unit to operationally manage a radio element packet control unit of the network and provide packet control unit statistics;

using a second operational and management centre unit to operationally manage one or more General Packet Radio Services (GPRS) support nodes and provide support node statistics; and functionally combining one or more packet control unit statistics with one or more support node statistics to provide a joint network statistic.

2. A method as claimed in claim 1, wherein a plurality of packet control unit statistics are functionally combined with each other prior to being combined with the one or more support node statistics.

3. A method according to claim 1, wherein a plurality of support node statistics are functionally combined with each other prior to being combined with the one or more packet control unit statistics.

4. A method according to claim 1, wherein the packet radio cellular communications network is a General Packet Radio Services, GPRS, cellular communications network.

5. An apparatus for analysing a packet radio cellular communications network, the apparatus comprising:
- a first operational and management centre unit for operationally managing a radio element packet control unit of the network and providing packet control unit statistics;
- a second operational and management centre unit for operationally managing one or more General Packet Radio Services (GPRS) support nodes and providing support node statistics; and
- means for functionally combining one or more packet control unit statistics with one or more support node statistics to provide a joint network statistic.

6. An apparatus as claimed in claim 5, further comprising means for functionally combining a plurality of packet control unit statistics with each other prior to them being combined with the one or more support node statistics.

7. An apparatus according to claim 5, further comprising means for functionally combining a plurality of support node statistics with each other prior to them being combined with the one or more packet control unit statistics.

8. An apparatus according to claim 5, wherein the packet radio cellular communications network is a General Packet Radio Services, GPRS, cellular communications network.

* * * * *